2 Sheets—Sheet 1.

W. HALSTED.
Track Clearer.

No. 196,294. Patented Oct. 23, 1877.

Witnesses.

Inventor.
William Halsted
per John J. Halsted
Atty.

2 Sheets—Sheet 2.

W. HALSTED.
Track Clearer.

No. 196,294. Patented Oct. 23, 1877.

Witnesses.

Inventor.
William Halsted
per John J. Halsted
Atty.

UNITED STATES PATENT OFFICE.

WILLIAM HALSTED, OF TRENTON, NEW JERSEY.

IMPROVEMENT IN TRACK-CLEARERS.

Specification forming part of Letters Patent No. 196,294, dated October 23, 1877; application filed August 2, 1877.

*To all whom it may concern:*

Be it known that I, WILLIAM HALSTED, of the city of Trenton, in the county of Mercer and State of New Jersey, have invented certain new and useful Improvements in Locomotive Track-Lighter and Life-Preserving Track-Clearer; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to a new and improved method of lighting railroad-tracks, and in such a manner as to enable the engineer to discover obstructions upon the track more easily and at a greater distance than has heretofore been practicable, and also to means for removing such obstructions, and, if there be human beings or live animals upon the track, to remove them without destroying life or fatally injuring them.

Figure 1:
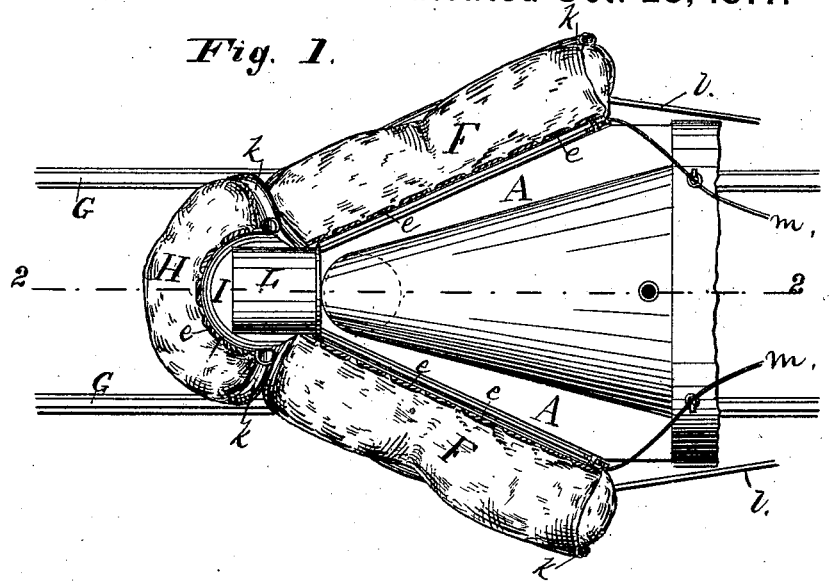
Figure 2:
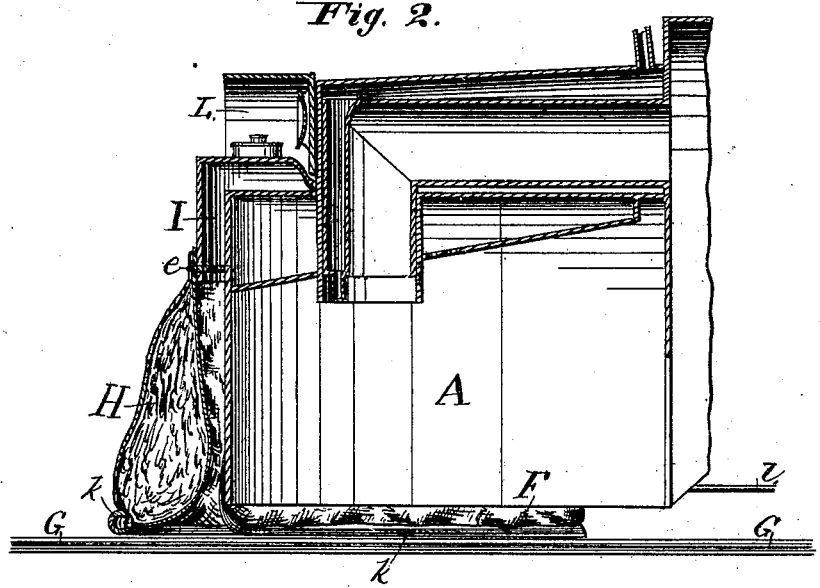
Figure 3:
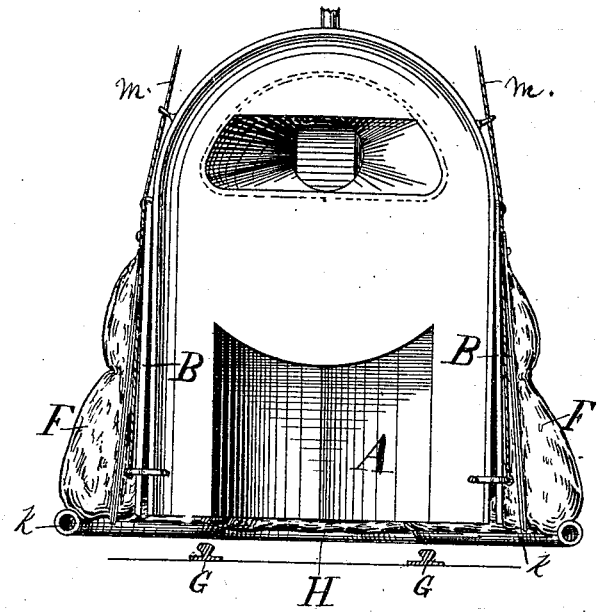
Figure 4:
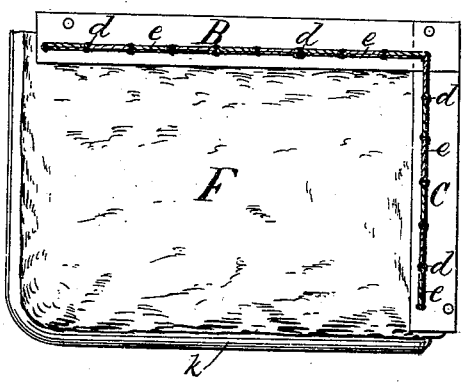
Figure 5:
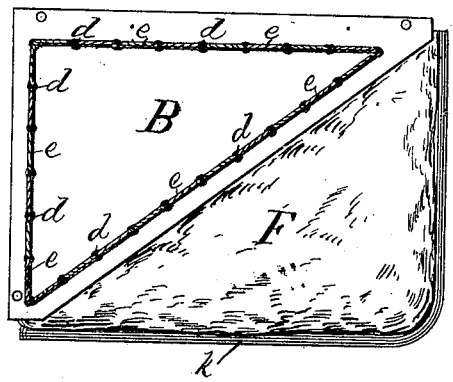

Figure 1 is a plan, Fig. 2 a longitudinal vertical section through the line 2 2 of Fig. 1, Fig. 3 a rear elevation, and Figs. 4 and 5 details, of apparatus illustrating my invention.

A is a triangular box, just long enough to fit on and to cover the cow-catcher, and in this respect is made substantially in the same manner as that described in the specification of my spark-arrester, patented September 28, 1875, No. 168,091. I suspend a frame the whole length of each of the sides of this triangular box, such frames being composed of a piece, B, say about from six to eight inches wide, and of another piece, C, or projection therefrom at its back end, of about the same width, which should extend downward nearly to the bottom of the triangular box, so as to be in the shape of a capital letter L, as shown in Fig. 4; or it may be of a triangular shape, broadest at its rear end, as shown in Fig. 5. This piece or these pieces, as the case may be, I perforate with a number of holes, *d d*, along the whole length of each of them, or otherwise, these holes being of a diameter from a quarter to a half inch, so that small cords or ropes *e* may be readily passed through them. F F are mattresses, a few inches longer and a few inches wider than the side of the triangular box A, and stuffed with straw or husks, moss, cotton, or any other soft or pliable substance. The covering of the mattress may be cloth, coarse linen, bagging, or leather.

I attach one of these mattresses at each side of box A, by securing two of its sides to the perforated frame above named by means of small cords run through the holes *d d* in said frame, so that said mattress may be hung perpendicularly down along the side of the box A, and that its lower side or edge may be nearly on a level with the top of the rail G.

Another mattress, H, may be suspended upon an arched projection, I, which extends a few inches beyond the front part of the triangular box, and also a few inches around on each side of the mattresses F F. This projection I should be made of iron or strong wood, with holes perforated through it at a distance of two or three inches apart, by means of which the mattress H may be attached to it, and be free to swing backward and forward on it. This mattress should be made wider at its bottom than at its top, so that its bottom part should extend beyond or overlap the side mattresses when either or both of the latter may swing or be swung open, and this front mattress H should have its lower part about on the level with the top of the tracks or rails, for the purpose of breaking the force of any blow which may be given by them.

India-rubber tubes *k*, of a diameter, say, from four to six inches, may be attached to the lower edge of each one of the three mattresses, so that any object lying or being on the track would come first in contact with such tubes and be shoved off sidewise by them. The side wings or frame-works must be so attached at their upper part as not to fly open when their lower parts, together with the mattresses secured to them, fly or swing up or open.

Over the front edge or end of this triangular box A, and consequently farther forward and lower down than is practicable in ordinary locomotives, I place a head-light, L, either an electric light or a light made from burning magnesium wire, or a gas-light, or any other having requisite illuminating power; and as in my construction there is no upright smoke-stack to intercept or obstruct the view of the track by the engineer, but, on the contrary, a low and horizontal one, he will be able readily to discern any object or animal on the railroad at such a distance ahead as to be able to diminish the speed of the engine so much before it reaches it that the life-preserving machine will push or ward any person or animal off the railroad without fatally or seriously injuring him or it.

The side frames to which the mattresses are attached should be suspended by hinges to the top of the box A, in such a manner that they may be moved or spread outward, and consequently upward and downward, like the wings of a bird. This motion may be given to them by an eccentric or eccentrics on one of the axles of the truck which sustains the boiler of the engine, or by any other appropriate device which will give an endwise movement to the rods $l$ $l$ attached to the lower part of the frames or wings B or B C.

At the lower back corner of one or both of the mattress-frames I also attach a wire or rod, $m$, which shall reach up to the top of the boiler, and there pass through an eye or pulley on top of the engine, and then connect with other suitable wires or rods or cords, which last-mentioned cord is to be attached to the handle, arm, or lever of the bell on the locomotive, in such a manner that the moving upward and downward of the frame on which the mattress hangs will cause this bell to ring.

My improved location of the head-light, admitting of throwing the light so directly upon the track, and extending the unimpeded vision of the engineer more completely over the whole track, without any effort to lean to either side to see in advance of a smoke-stack, and also casting the rays farther forward than usual, enables him to see dangers farther ahead, and affords him more time for action; and, by the aid of air-brakes or other brakes now in general use, he can thus apply and bring the same into operation more quickly and promptly than heretofore, and to slacken up and stop the train sooner than otherwise, so as to avoid many dangers and calamities, and to lessen others, and, with such reduction of speed, to so diminish the blow in case of striking living beings on the track as, in conjunction with the track-clearer, to remove such persons or animals with but little risk of injury.

I claim—

1. The track-clearer as shown and described, consisting of the triangular box over the cow-catcher, provided with the pads or mattresses F F, as set forth.

2. The triangular box or shell A of the track-clearer, adapted to furnish a support for the head-light at its forward end, substantially as shown and described.

3. In combination with the box A, the side wings or frames B, and the pads or mattresses, these wings being free to be operated from the wheels of the engine, and in their motions adapted to cause the ringing of the locomotive-bell, substantially as and for the purpose described.

4. In combination with the box or shell A, adapted to support a head-light at its foremost end, the pads or mattresses F F and H, substantially as shown and described.

WM. HALSTED.

Witnesses:
ANNIE S. MELLACH,
ANNIE M. FITZPATRICK.